United States Patent [19]
McCurdy

[11] Patent Number: 5,684,336
[45] Date of Patent: Nov. 4, 1997

[54] CRASH SENSOR ASSEMBLY INCLUDING BOTH AN INERTIA SENSOR AND AN ACCELEROMETER AND METHOD

[75] Inventor: Roger Allen McCurdy, Troy, Mich.

[73] Assignee: TRW Inc., Lyndhurst, Ohio

[21] Appl. No.: 606,484

[22] Filed: Mar. 4, 1996

[51] Int. Cl.⁶ ........................................... B60R 21/16
[52] U.S. Cl. ................... 307/10.1; 180/282; 280/735; 200/61.45 R; 307/121
[58] Field of Search .................... 307/9.1, 10.1, 307/119–121; 200/61.53, 61.45 R; 280/734, 735; 180/282, 271; 324/162; 340/436, 438, 669; 73/1 D, 652, 488, 510, 511, 493

[56] References Cited

U.S. PATENT DOCUMENTS

| | | | |
|---|---|---|---|
| 3,848,695 | 11/1974 | Lacaze, Jr. | 280/735 |
| 3,889,130 | 6/1975 | Breed | 200/61.45 R |
| 4,097,699 | 6/1978 | Larson | 200/61.45 R |
| 4,700,973 | 10/1987 | Gademann et al. | 280/735 |
| 4,985,604 | 1/1991 | Tyebkhan . | |
| 5,032,737 | 7/1991 | Holm et al. | 307/9.1 |
| 5,053,588 | 10/1991 | Bolender | 200/61.45 R |
| 5,059,751 | 10/1991 | Woodman et al. | 280/735 |
| 5,173,614 | 12/1992 | Woehrl et al. | 307/10.1 |
| 5,181,011 | 1/1993 | Okano | 340/438 |
| 5,216,607 | 6/1993 | Diller et al. | 340/438 |
| 5,326,133 | 7/1994 | Breed et al. | 280/735 |
| 5,373,126 | 12/1994 | Manandhar et al. | 200/61.53 |
| 5,381,334 | 1/1995 | Furui | 307/10.1 |
| 5,503,016 | 4/1996 | Koen | 73/493 |

*Primary Examiner*—Richard T. Elms
*Attorney, Agent, or Firm*—Tarolli, Sundheim, Covell, Tummino & Szabo

[57] ABSTRACT

A crash sensor assembly (10) includes a base (12). Mounted on the base (12) are an inertia sensor assembly (32) having an axis of sensitivity (40) and an accelerometer assembly (56) having an axis of sensitivity (64). The accelerometer assembly (56) is mounted such that its axis of sensitivity (64) is substantially parallel to the axis of sensitivity (40) of the inertia sensor assembly (32). The base (12) includes terminal supports (24, 26) which provide for physical mounting of and electrical connection to the inertia sensor assembly (32) and accelerometer assembly (56). A housing (32) sealingly engages with the base (12) to house and protect the inertia sensor assembly (32) and accelerometer assembly (56).

10 Claims, 1 Drawing Sheet

CRASH SENSOR ASSEMBLY INCLUDING BOTH AN INERTIA SENSOR AND AN ACCELEROMETER AND METHOD

BACKGROUND OF THE INVENTION

1. Technical Field

The present invention is directed to an actuatable restraint system and is particularly directed to a method and apparatus for mounting a crash sensor for an actuatable restraint system.

2. Background of the Invention

Actuatable restraint systems, such as air bag restraint systems for vehicles, are known in the art. These systems typically include a sensor for sensing the occurrence of a vehicle crash condition. When a vehicle crash condition of sufficient magnitude is sensed, the restraint is actuated, e.g., an air bag is deployed.

Known crash sensors include inertia sensors and/or accelerometers. Often, these sensors are used in combination in actuatable restraint systems for the purpose of discriminating between deployment crash conditions and non-deployment crash conditions. In known systems, the inertia crash sensor and the accelerometer are separately mounted to a printed circuit board ("PCB"). Each of the sensors is typically mounted manually. Obviously, the cost of mounting two sensors is more than the cost of mounting a single sensor or single sensor assembly.

Each crash sensor has an axis of sensitivity. Each crash sensor provides a crash signal indicative of crash acceleration relative to its axis of sensitivity. Therefore, if the crash sensors are to measure frontal crash acceleration, their axis of sensitivity must be oriented in a direction parallel with the front-to-rear axis of the vehicle.

Because the inertia sensor and the accelerometer are separately mounted in known systems, care must be taken to insure that their associated axes of sensitivity are oriented parallel to each other and to the front-to-rear axis of the vehicle. Typically, an accelerometer has an axis of sensitivity which is normal to the planar surface of the accelerometer. The accelerometer must be mounted perpendicular to the PCB. This perpendicular mounting requires special mounting considerations which adds to the expense of the overall crash sensor arrangement for the actuatable restraint system. Also, because the inertia switch and the accelerometer are separate components, they are tested and calibrated separately using separate test devices. Again, this adds to the overall expense of the crash sensor arrangement for the actuatable restraint system.

SUMMARY OF THE INVENTION

In accordance with the present invention, a crash sensor assembly is provided having both an inertia sensor and an accelerometer mounted in a single package with their associated axis of sensitivity oriented parallel to each other. The crash sensor assembly is mountable to a printed circuit board.

In accordance with one embodiment of the present invention, a crash sensor assembly comprises a base mounting member having a planar mounting surface. An inertia sensor having an axis of sensitivity is secured to the planar mounting surface of the base member. A secondary mounting member having a planar side is secured to the planar mounting surface of the base member such that the planar side of the secondary mounting member is substantially perpendicular to the axis of sensitivity of the inertia sensor. An accelerometer is secured to the planar side of the secondary mounting member. Means are provided for securing said base mounting member to a circuit board and means are provided for permitting electrical communication with the inertia sensor and the accelerometer.

In accordance with another embodiment of the present invention, a crash sensor assembly comprises a base mounting member having a planar mounting surface. An inertia sensor having an axis of sensitivity is secured to the planar mounting surface of the base member. A secondary mounting member having a planar side is secured to the planar mounting surface of the base member such that the planar side of the secondary mounting member is substantially perpendicular to the axis of sensitivity of the inertia sensor. The secondary mounting member further includes a plurality of electrically conductive traces disposed on the planar side of the secondary mounting member. An accelerometer having an axis of sensitivity is secured to the planar side of the secondary mounting member so that the axis of sensitivity of the accelerometer is substantially parallel to the axis of sensitivity of the inertia sensor. An application specific integrated circuit (ASIC) is secured to the planar side of the secondary mounting member and is spaced away from the accelerometer. The ASIC, the accelerometer, the conductive traces are electrically connected by lead frames.

In accordance with another embodiment of the present invention, a method is provided for assembling a crash sensor comprising the steps of mounting an inertia sensor having an axis of sensitivity to a planar side of a base mounting member. A secondary mounting member having a planar side is secured to the planar side of the base member such that the planar side of the secondary mounting member is substantially perpendicular to the axis of sensitivity of the inertia sensor. An accelerometer is secured to the planar side of the secondary mounting member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figures 1, 2:
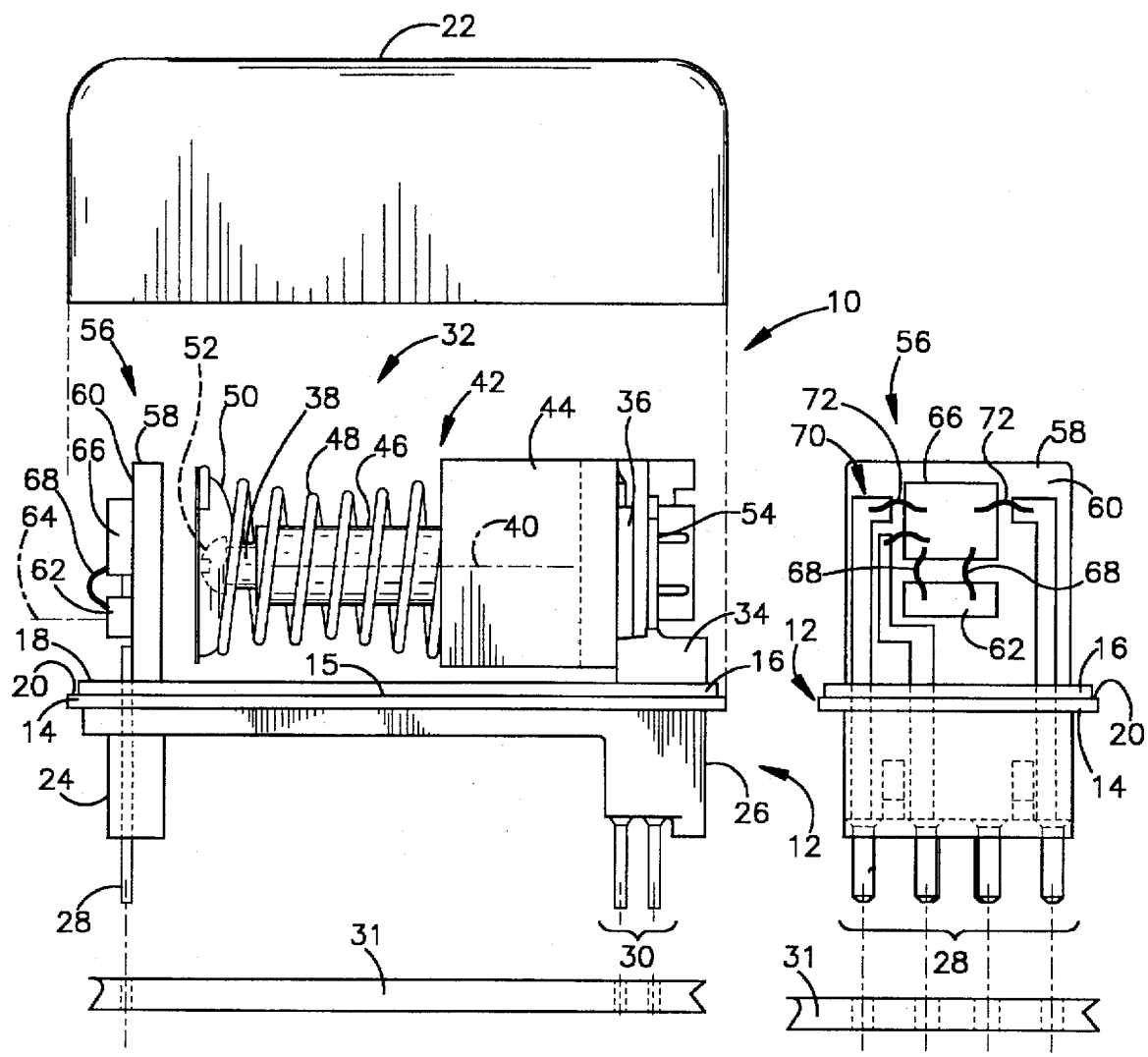
FIG. 1 is a side view of a crash sensor assembly made in accordance with the present invention.
FIG. 2 is an end view of the crash sensor assembly of FIG. 1.

FIGS. 1 and 2 show an integrated crash sensor assembly 10 which includes a base 12 preferably made of plastic. The base 12 includes a bottom plate 14 having an upper surface 15 and a top plate 16 having an upper surface 18. The top plate 16 is secured to the upper surface 15 of the bottom plate 14. FIGS. 1 and 2 illustrate that the top plate 16 is smaller than the bottom plate 14 such that a lip 20 is formed around the periphery of the bottom plate 14. A housing 22, which is also preferably made of plastic, rests on the lip 20 to seal and protect the components of the integrated crash sensor assembly 10.

The bottom plate 14 has a first terminal support 24 and a second terminal support 26 secured thereto. The terminal supports 24, 26 extend substantially perpendicular from the plane of bottom plate 14. In a preferred embodiment, the first and second terminal supports 24 and 26 are molded from plastic and are an integral part of the base 12.

Electrical terminals 28 and 30 project from the bottoms of the first terminal support 24 and second terminal support 26, respectively. These terminals 28, 30 are made of a suitable electrically conductive material. The terminals 28 and 30 function to provide for physical mounting and electrical connection of the integrated crash sensor assembly 10 to a printed circuit board 31 which is part of the occupant restraint system.

The integrated crash sensor assembly 10 further includes an inertia sensor assembly 32. The inertia sensor assembly 32 may be any of a plurality of known designs. One such inertia sensor assembly for use with the present invention is a coil-spring inertia sensor of the type disclosed and fully described in U.S. Pat. No. 5,373,126 to Manandhar et al. and assigned to TRW Technar Inc., which is hereby fully incorporated herein by reference. It is understood that the inertia sensor assembly 32 may also be a roller ball switch, a rolamite switch, or any of the other types of inertia sensors known in the art.

The inertia sensor assembly 32, in accordance with this preferred embodiment, has a first pedestal 34 which is secured to the upper surface 18 of the top plate 16. A second pedestal 36 is secured to the first pedestal 34. The second pedestal 36 is substantially perpendicular to the planar surface 18 of the top plate 16. In a preferred embodiment, the first and second pedestals 34 and 36 are molded from plastic and are an integral part of the base member 12.

A tubular rod 38 is secured at one end to the pedestal 36 such that the rod 38 is cantilevered. The rod 38 has a longitudinal axis 40 which is parallel to the upper surface 18 of the top plate 16. A mass 42 is slidably mounted on the rod 38 and, in turn, along the axis 40 between an actuated position and an unactuated position. The mass 42 includes a first cylindrical portion 44 and a second cylindrical portion 46. Each cylindrical portion 44 and 46 has a cross-sectional diameter. The cross-sectional diameter of the first cylindrical portion 44 is greater than that of the second cylindrical portion 46.

A helical spring 48 is wound around the second cylindrical portion 46. One end of the spring 48 presses against the side of the first cylindrical portion 44. A washer 50 is secured to the free end of rod portion 38. The other end of the spring 48 presses against this washer. The spring 48 is compressed between the washer 50 and first cylindrical portion 44 of the mass 42. Thus, the spring 48 exerts a bias force against the mass 42 to bias the mass 42 to the unactuated position. An adjustment screw 52 adjusts the compression and hence the bias force of the spring 48 by moving the washer along the axis 40.

A switch assembly 54 is operatively mounted to pedestal portion 34 and pedestal portion 36. The switch assembly 54 includes switch contacts held in an open condition by the cylindrical portion 44 when the mass 42 is at the furthermost position away from the washer 50. Each terminal of a switch contact is connected to an associated terminal 30. When the mass 42 holds the switch contacts open, there is an open circuit between the terminals 30.

The axis 40 defines the axis of sensitivity of the inertia sensor assembly 32. When an acceleration of a sufficient magnitude is experienced in a direction away from the washer 50 along the axis 40, the mass 42 moves against the bias force of the spring 48 in the direction of the washer 50. This movement of the mass 42 causes the switch contacts of switch assembly 54 to close and effect an electrical short circuit between the two terminals 30 on the second terminal support 26. A short circuit between terminals 30 is an indication of the occurrence of a deployment crash event. External crash detection circuitry (not shown) processes the occurrence of a short circuit of the switch as part of a crash detection algorithm.

The integrated crash sensor assembly 10 further includes an accelerometer assembly 56. The accelerometer assembly 56 comprises a plastic carrier 58 having a planar surface 60. The plastic carrier 58 is secured to the upper surface 18 of plate 16 so that the axis 40 is substantially perpendicular to the planar surface 60 of carrier 58. An accelerometer 62 having an axis of sensitivity 64 is mounted to the surface 60. An electrical signal indicating acceleration in a direction parallel to the axis of sensitivity 64 is output by the accelerometer 62. The accelerometer 62 is mounted so that its axis of sensitivity 64 is parallel to the axis of sensitivity 40 of the inertia sensor assembly 32.

An application specific integrated circuit "(ASIC)" 66 is also mounted to the planar surface 60 and is spaced apart from the accelerometer 62. Electrical interconnection of the ASIC 66 and the accelerometer 62 is accomplished by wire bonds 68. Typically, the ASIC 66 contains circuitry for energizing, monitoring, and conditioning the signal output by the accelerometer 62. The ASIC 66 may additionally contain circuitry for performing a crash detection algorithm using the accelerometer output signal. The ASIC 66 is electrically connected through wire bonds 72 to a lead frame 70.

The lead frame 70 may be molded in the plastic carrier 58, or may be electrically conductive traces disposed on the planar surface 60. The terminals 28 are electrically connected to the lead frame 70. The lead frame 70 facilitates external electrical connections between terminals 28 and the ASIC 66.

The accelerometer assembly 56, shown in FIGS. 1 and 2, is enlarged to facilitate illustration and description. In a preferred embodiment of the accelerometer assembly 56, the height of the plastic carrier 58 is much smaller than shown. This smaller size allows for installation of the spring 48 and for access to the adjustment screw 52.

Figure 3:
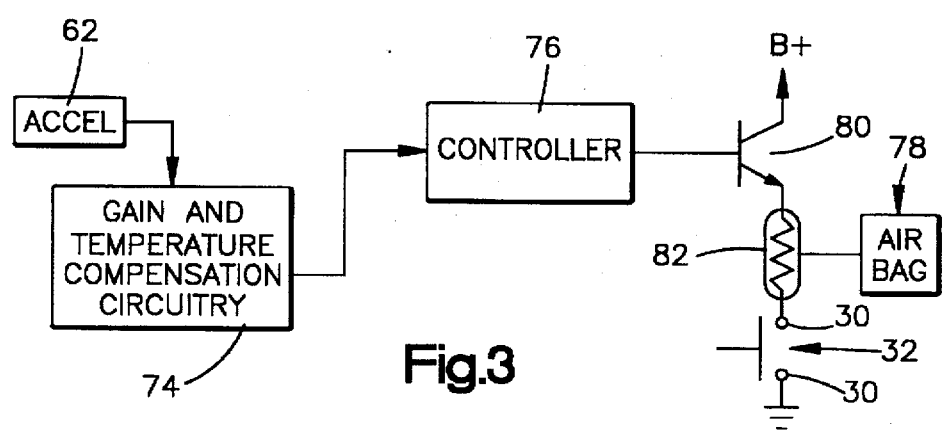
FIG. 3 is circuit schematic showing the inertia sensor and accelerometer of FIG. 1 in an actuatable restraint system.

Referring to FIG. 3, one embodiment of an occupant restraint system using the crash sensor assembly of the present invention is shown. The accelerometer 62 provides an acceleration output signal coupled through terminals 28 to a gain and temperature compensation circuit 74. The circuit 74 maintains the gain of the accelerometer at a desired level and compensates the output signal of the accelerometer for temperature variances. A compensated acceleration signal is output by the circuit 74.

A controller 76, such as a microcomputer, monitors the compensated acceleration output signal and determines if a deployment crash event is occurring. The process the controller 76 uses in making this determination is referred to as a "crash algorithm." There are several known crash algorithms in the art. An example of one such algorithm is described in U.S. Pat. No. 5,216,607 to Diller et al., which is hereby fully incorporated herein by reference. Those skilled in the art will appreciate that another crash algorithm may be used. Typically, a crash algorithm is determined through empirical crash testing of a particular vehicle platform of interest.

The output of the controller 76 is controllably connected to a switching transistor 80. The switching transistor 80 is connected in series between a source of electrical energy, such as the vehicle battery B+, and one terminal of a squib 82. A second terminal of the squib 82 is connected to one of the terminals 30 of the inertia sensor assembly 32. The other terminal 30 of the inertia sensor assembly 32 is connected to electrical ground.

When the controller 76 determines that a deployment crash condition is occurring, it actuates switching transistor 80 ON. When switching transistor 80 is ON and the switch contacts of switch assembly 54 of the inertia sensor assembly 32 close (i.e. short circuit), the squib 82 becomes energized. The squib 82 is operatively connected to an actuatable restraining device such as an air bag assembly 78 in a manner well known in the art. When the squib 82 is energized, the air bag of assembly 78 is deployed. Other actuatable restraining devices that can use the present invention include knee blockers, seat belt pretensioners, etc.

With this single package arrangement, a single operation is used to mount both sensors to the printed circuit board 31. A single set-up can be used to test and calibrate both the inertia sensor assembly 32 and the accelerometer assembly 56. This arrangement also eliminates the need for a separated mounting bracket on the PC board 31 for the accelerometer assembly 56 and reduces the needed PC board population area.

From the above description of the invention, those skilled in the art will perceive improvements, changes, and modifications. Such improvements, changes and modifications within the skill of the art are intended to be covered by the appended claims.

Having described the invention, the following is claimed:

1. A crash sensor assembly comprising:

a base member having a planar mounting surface;

means for connecting said crash sensor assembly to a circuit board, including means for securing said base member to the circuit board;

an inertia sensor for sensing a condition indicative of a crash, said inertia sensor having an axis of sensitivity, said inertia sensor secured to said planar mounting surface for maintaining said axis of sensitivity of said inertia sensor relative to said base member independent of said means for securing said base member to the circuit board;

an accelerometer for sensing acceleration, said accelerometer having an axis of sensitivity; and a mounting member having a planar side extending substantially perpendicular to said planar mounting surface, said accelerometer secured to said planar side and said mounting member secured to said base member for maintaining said axis of sensitivity of said accelerometer relative to said base member and said axis of sensitivity of said inertia sensor independent of said means for securing said base member to the circuit board.

2. A crash sensor assembly as set forth in claim 1, wherein said base member is located between the circuit board and said inertia sensor, said mounting member, and said accelerometer.

3. A crash sensor assembly as set forth in claim 1, wherein said planar mounting surface faces away from the circuit board.

4. A crash sensor assembly as set forth in claim 1, wherein said means for connecting said crash sensor assembly to the circuit board include means for spacing said planar mounting surface away from the circuit board.

5. A crash sensor assembly as set forth in claim 1, wherein said axis of sensitivity of said accelerometer is substantially parallel to said axis of sensitivity of said inertia member.

6. A method of assembling and mounting a crash sensor, said method comprising:

securing an inertia sensor, having an axis of sensitivity, to a planar mounting surface of a base member for maintaining the axis of sensitivity of the inertia sensor relative to the base member;

securing a mounting member, having a planar side, to the planar mounting surface for maintaining the planar side substantially perpendicular to the planar mounting surface;

securing an accelerometer, having an axis of sensitivity, to the planar side for maintaining the axis of sensitivity of the accelerometer relative to the mounting member, the base member, and the axis of sensitivity of the inertia sensor; and connecting the crash sensor to a circuit board, including securing the base member to the circuit board.

7. A method as set forth in claim 6, wherein said step of connecting the crash sensor to the circuit board includes fixing the base member at a location between the circuit board and the inertia sensor, the mounting member, and the accelerometer.

8. A method as set forth in claim 6, wherein said step of connecting the crash sensor to the circuit board includes fixing the planar mounting surface to face away from the circuit board.

9. A method as set forth in claim 6, wherein said step of connecting the crash sensor to the circuit board includes fixing the planar mounting surface at a location spaced away from the circuit board.

10. A method as set forth in claim 6, wherein said step of securing the accelerometer includes fixing the axis of sensitivity of the accelerometer substantially parallel to the axis of sensitivity of the inertia member.

\* \* \* \* \*